United States Patent [19]
Hoarty

[11] Patent Number: 5,594,507
[45] Date of Patent: Jan. 14, 1997

[54] COMPRESSED DIGITAL OVERLAY CONTROLLER AND METHOD FOR MPEG TYPE VIDEO SIGNAL

[75] Inventor: W. Leo Hoarty, Morgan Hill, Calif.

[73] Assignee: ICTV, Inc., Santa Clara, Calif.

[21] Appl. No.: 250,723

[22] Filed: May 27, 1994

Related U.S. Application Data

[63] Continuation-in-part of Ser. No. 56,958, May 3, 1993, which is a continuation-in-part of Ser. No. 877,325, May 1, 1992, Pat. No. 5,412,325, which is a continuation-in-part of Ser. No. 754,932, Sep. 10, 1991, Pat. No. 5,220,420, which is a continuation-in-part of Ser. No. 589,205, Sep. 27, 1990, Pat. No. 5,093,718.

[51] Int. Cl.$^6$ .................................................. H04N 5/272
[52] U.S. Cl. .......................................... 348/584; 348/598
[58] Field of Search ..................................... 348/584, 585, 348/586, 588, 589, 598, 599, 600

[56] References Cited

U.S. PATENT DOCUMENTS

| | | | |
|---|---|---|---|
| 4,032,972 | 6/1977 | Saylor | 358/142 |
| 4,077,006 | 2/1978 | Nicholson | 325/308 |
| 4,081,831 | 3/1978 | Tang et al. | 358/114 |
| 4,245,245 | 1/1981 | Matsumoto et al. | 358/122 |
| 4,247,106 | 1/1981 | Jeffers et al. | 273/85 G |
| 4,253,114 | 2/1981 | Tang et al. | 358/114 |
| 4,264,924 | 4/1981 | Freeman | 358/86 |
| 4,290,142 | 9/1981 | Schnee et al. | 455/3 |
| 4,367,557 | 1/1983 | Stern et al. | 455/4 |
| 4,450,477 | 5/1984 | Lovett | 358/86 |
| 4,454,538 | 6/1984 | Toriumi | 358/86 |
| 4,466,017 | 8/1984 | Banker | 358/120 |
| 4,471,380 | 9/1984 | Mobley | 358/120 |
| 4,491,983 | 1/1985 | Pinnow et al. | 455/612 |
| 4,506,387 | 3/1985 | Walter | 455/612 |
| 4,507,680 | 3/1985 | Freeman | 358/86 |

(List continued on next page.)

OTHER PUBLICATIONS

Dukes, Stephen D., "Photonics for cable television system design", *Communications Engineering and Design*, 1992.
Langenberg, Earl, "Integrating Entertainment and Voice on the Cable Network", pp. 187–194.
Large, David, "Tapped Fiber vs Fiber–Reinforced Coaxial CATV Systems; A Comparison of Evolutionary Paths", pp. 1–21 1989.
*InSight* –brochure.
European Patent Application 0 477 786 A2.
European Patent Application 0 449 633 A1.
World Patent Application WO 90/13972.
UK Patent Application GB 2 248 955 A.
Le Gall, Didier, "MPEG: A Video Compression Standard for Multimedia Applications", Communication of the ACM, vol. 34, No. 4, Apr., 1991, New York, NY.

(List continued on next page.)

*Primary Examiner*—Victor R. Kostak
*Assistant Examiner*—Nathan J. Flynn
*Attorney, Agent, or Firm*—Bromberg & Sunstein

[57] ABSTRACT

A controller, in accordance with a preferred embodiment provides, in a specified region of first television picture generated by a first digitally compressed video signal, an overlay of a second picture embodied in a second video signal. The controller includes an I-frame buffer for storing updated macroblock pixel data in I-frame format derived from the second signal. The controller also has a matte mask storage register for storing data that identifies the specified region by means of macroblocks. A matte substitution processor is in communication with the matte mask storage register and has as an input the first signal and provides an overlayed output; the controller inhibits transmission to the output of any macroblock, of the first signal's data stream, lying in the specified region. It also functions to substitute for such macroblock a corresponding macroblock from the I-frame buffer. Further embodiments permit overlay of a graphic display for interactive television on a picture derived from a digitally compressed video signal.

13 Claims, 3 Drawing Sheets

U.S. PATENT DOCUMENTS

| | | | |
|---|---|---|---|
| 4,509,073 | 4/1985 | Baran et al. | 358/86 |
| 4,523,228 | 6/1985 | Banker | 358/120 |
| 4,533,948 | 8/1985 | McNamara et al. | 358/122 |
| 4,536,791 | 8/1985 | Campbell et al. | 358/147 |
| 4,538,174 | 8/1985 | Gargini et al. | 358/86 |
| 4,567,517 | 1/1986 | Mobley | 358/120 |
| 4,573,072 | 2/1986 | Freeman | 358/86 |
| 4,591,906 | 5/1986 | Morales-Garza et al. | 358/84 |
| 4,602,279 | 7/1986 | Freeman | 358/86 |
| 4,616,263 | 10/1986 | Eichelberger | 358/185 |
| 4,627,105 | 12/1986 | Ohashi et al. | 455/612 |
| 4,633,462 | 12/1986 | Stifle et al. | 370/85 |
| 4,695,880 | 9/1987 | Johnson et al. | 358/86 |
| 4,706,121 | 11/1987 | Young | 358/142 |
| 4,709,418 | 11/1987 | Fox et al. | 455/612 |
| 4,710,971 | 12/1987 | Nozaki et al. | 455/179 |
| 4,748,689 | 5/1988 | Mohr | 455/612 |
| 4,760,442 | 7/1988 | O'Connell et al. | 358/86 |
| 4,769,833 | 9/1988 | Farleigh et al. | 379/105 |
| 4,769,838 | 9/1988 | Hasegawa | 380/7 |
| 4,801,190 | 1/1989 | Imoto | 350/96.16 |
| 4,821,102 | 4/1989 | Ichikawa et al. | 358/183 |
| 4,823,386 | 4/1989 | Dumbauld et al. | 380/13 |
| 4,827,253 | 5/1989 | Maltz | 340/734 |
| 4,829,372 | 5/1989 | McCalley et al. | 358/86 |
| 4,847,700 | 7/1989 | Freeman | 358/343 |
| 4,860,379 | 8/1989 | Schoeneberger et al. | 455/5 |
| 4,891,694 | 1/1990 | Way | 358/86 |
| 4,901,367 | 2/1990 | Nicholson | 455/5 |
| 4,903,126 | 2/1990 | Kassatly | 358/146 |
| 4,912,760 | 3/1990 | West, Jr. et al. | 380/7 |
| 4,918,516 | 4/1990 | Freeman | 358/86 |
| 4,922,532 | 5/1990 | Farmer et al. | 380/15 |
| 4,941,040 | 7/1990 | Pocock | 358/86 |
| 4,947,244 | 8/1990 | Fenwick et al. | 358/86 |
| 4,963,995 | 10/1990 | Lang | 358/335 |
| 4,975,771 | 12/1990 | Kassatly | 358/146 |
| 4,994,909 | 2/1991 | Graves et al. | 358/86 |
| 4,995,078 | 2/1991 | Monslow et al. | 380/10 |
| 5,008,934 | 4/1991 | Endoh | 380/15 |
| 5,014,125 | 5/1991 | Pocock et al. | 358/86 |
| 5,027,400 | 6/1991 | Baji et al. | 380/20 |
| 5,057,917 | 10/1991 | Shalkauser et al. | 358/135 |
| 5,060,262 | 10/1991 | Bevins, Jr. et al. | 380/19 |
| 5,093,718 | 3/1992 | Hoarty et al. | 358/84 |
| 5,109,414 | 8/1992 | Harvey et al. | 380/9 |
| 5,119,188 | 6/1992 | McCalley et al. | 358/86 |
| 5,130,792 | 7/1992 | Tindell et al. | 358/85 |
| 5,132,992 | 7/1992 | Yurt et al. | 375/122 |
| 5,133,079 | 7/1992 | Ballantyne et al. | 455/4.1 |
| 5,172,413 | 12/1992 | Bradley et al. | 380/20 |
| 5,191,410 | 3/1993 | McCalley et al. | 358/86 |
| 5,231,494 | 7/1993 | Wachob | 358/146 |
| 5,253,341 | 10/1993 | Rozmanith et al. | 395/200 |
| 5,422,674 | 6/1995 | Hooper et al. | 348/409 |

OTHER PUBLICATIONS

Tamitani et al., "An Encoder/Decoder Chip Set for the MPEG Video Standard", 1992 IEEE International Conference on Acoustics, vol. 5, Mar., 1992, San Francisco, CA.

Van der Star, Jack A. M., "Video on Demand Without Compression: A Review of the Business Model, Regulation and Future Implication".

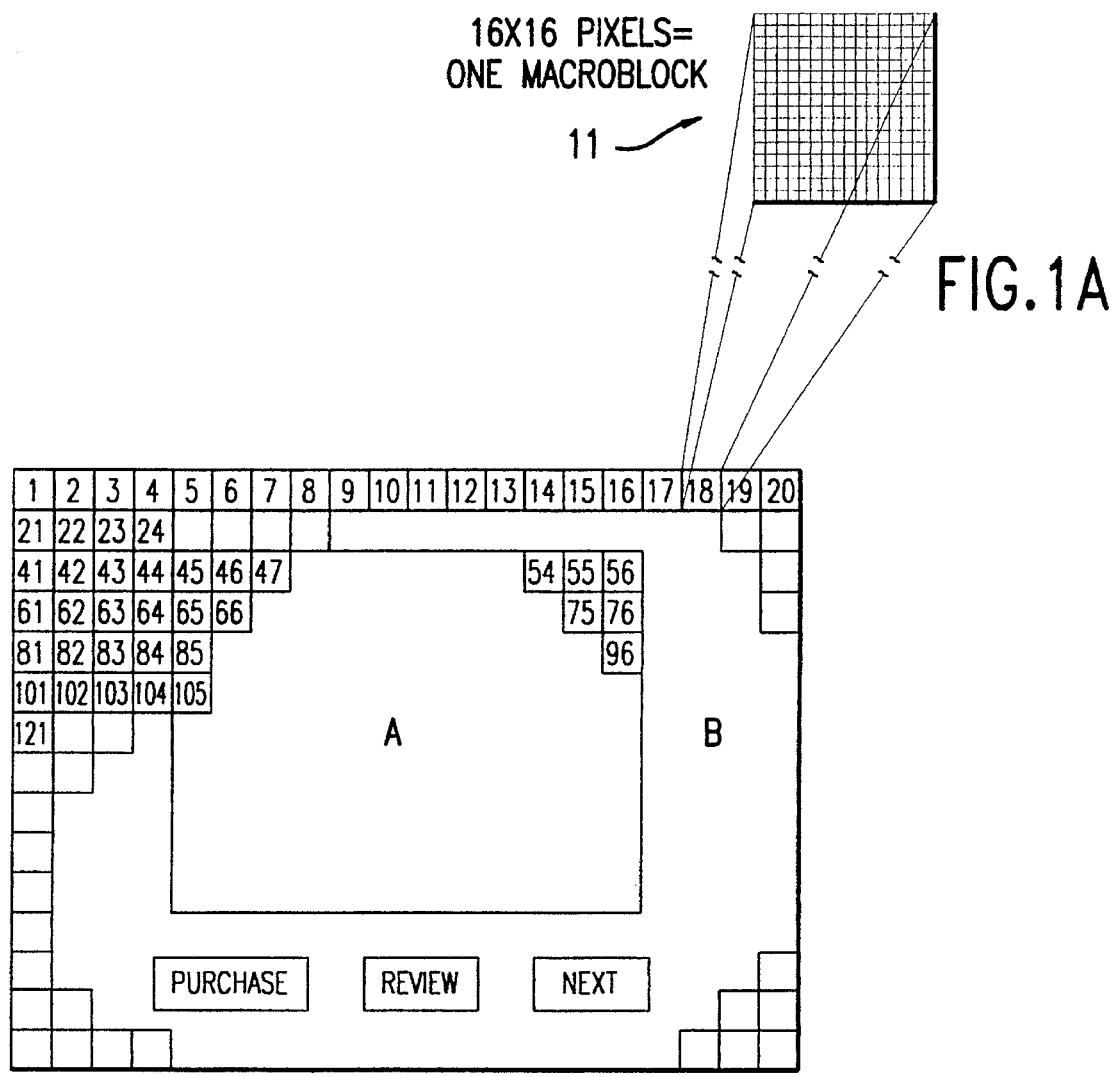

COMPRESSED DIGITAL OVERLAY CONTROLLER AND METHOD FOR MPEG TYPE VIDEO SIGNAL

This application is a continuation in part of U.S. application Ser. No. 08/056,958, filed May 3, 1993, which in turn is a continuation in part of U.S. application Ser. No. 07/877,325, filed May 1, 1992 issued as U.S. Pat. No. 5,412,325, which in turn is a continuation in part of U.S. application Ser. No. 07/754,932, filed Sep. 10, 1991 issued as U.S. Pat. No. 5,220,420, which is a continuation in part of U.S. application Ser. No. 07/589,205, filed Sep. 27, 1990, issued as U.S. Pat. No. 5,093,718. These related applications are incorporated herein by reference.

TECHNICAL FIELD

The present invention relates to controllers for providing in a first television picture generated by signals in a compressed digital format, such as under the MPEG2 standard, an overlay of a second picture.

BACKGROUND ART

Overlay controllers for analog television signals are well known in the art. The MPEG2 compression standard for digital video signals also contemplates the possibility of overlaying a first compressed digital video signal with a second compressed digital video signal. A controller for achieving the overlay of two such digitally compressed video signals is inherently complex. In some instances, it is desirable to overlay a compressed digital video signal (such as, for example, a movie or other material made available to a cable television subscriber) with a relatively slowly changing analog signal (such as, for example, a display including a movable cursor and a number of selection buttons to permit interactive cable television service to a subscriber operating a remote control unit causing movement of the cursor and operation of the buttons). In such a case, the art currently would require, before overlaying the signal, either (i) A-to-D conversion of the analog signal and its subsequent compression or (ii) decompression and D-to-A conversion of the digital signal. Such techniques are inefficient and expensive.

SUMMARY OF THE INVENTION

In accordance with a preferred embodiment of the invention there is provided a controller, for providing, in a specified region of first television picture generated by a first digitally compressed video signal, an overlay of a second picture embodied in a second video signal. The controller includes an I-frame buffer for storing updated macroblock pixel data in I-frame format derived from the second signal. The controller also has a matte mask storage register for storing data that identifies the specified region by means of macroblocks. A matte substitution processor is in communication with the matte mask storage register and has as an input the first signal and provides an overlayed output; the controller inhibits transmission to the output of any macroblock, of the first signal's data stream, lying in the specified region. It also functions to substitute for such macroblock a corresponding macroblock from the I-frame buffer. Further embodiments permit overlay of a graphic display for interactive television on a picture derived from a digitally compressed video signal.

BRIEF DESCRIPTION OF THE DRAWINGS

The invention will be more readily understood by reference to the following description taken with the accompanying drawings in which:

FIG. 1 is a diagram of the effect of an overlay in accordance with a preferred embodiment of the invention;

FIG. 2 is a diagram of a matte mask used to define the boundaries of the overlay in FIG. 1;

DETAILED DESCRIPTION OF SPECIFIC EMBODIMENTS

FIG. 1 illustrates the effect of an overlay of a first MPEG2 encoded digital video source, which is referred to below as source 1, by a second signal, which is referred to below as source 2. In the context of interactive television, source 1 may be, for example, a digitally compressed movie or other information service (as that term is defined above). Source 2 may be, for example, a graphic display, in analog format, showing a menu of choices available to a subscriber and a cursor movable by the subscriber (using a remote control), so arranged as to permit the subscriber to communicate interactively with the headend and to make a selection from the menu of choices. Thus, source 1 could be a movie preview, for example, and source 2 could present a menu of choices to the subscriber permitting selection of the movie or an opportunity to preview another movie, and so on. In this example, source 1 is shown in region A of FIG. 1 and source 2 is shown in region B.

In accordance with MPEG2 encoding, successive contiguous 16×16 square arrays (herein called "macroblocks") of pixels are identified over the entire picture area; a sample macroblock is shown as item 11 in FIG. 1. Each macroblock in the picture area is given a unique numerical address, in the general manner illustrated in FIG. 1, corresponding to its location in the picture.

The boundary between regions A and B in FIG. 1 is defined by a matte mask, shown in FIG. 2, that specifies the macroblock addresses that are included (or, alternatively, excluded) in region A.

Figure 3:
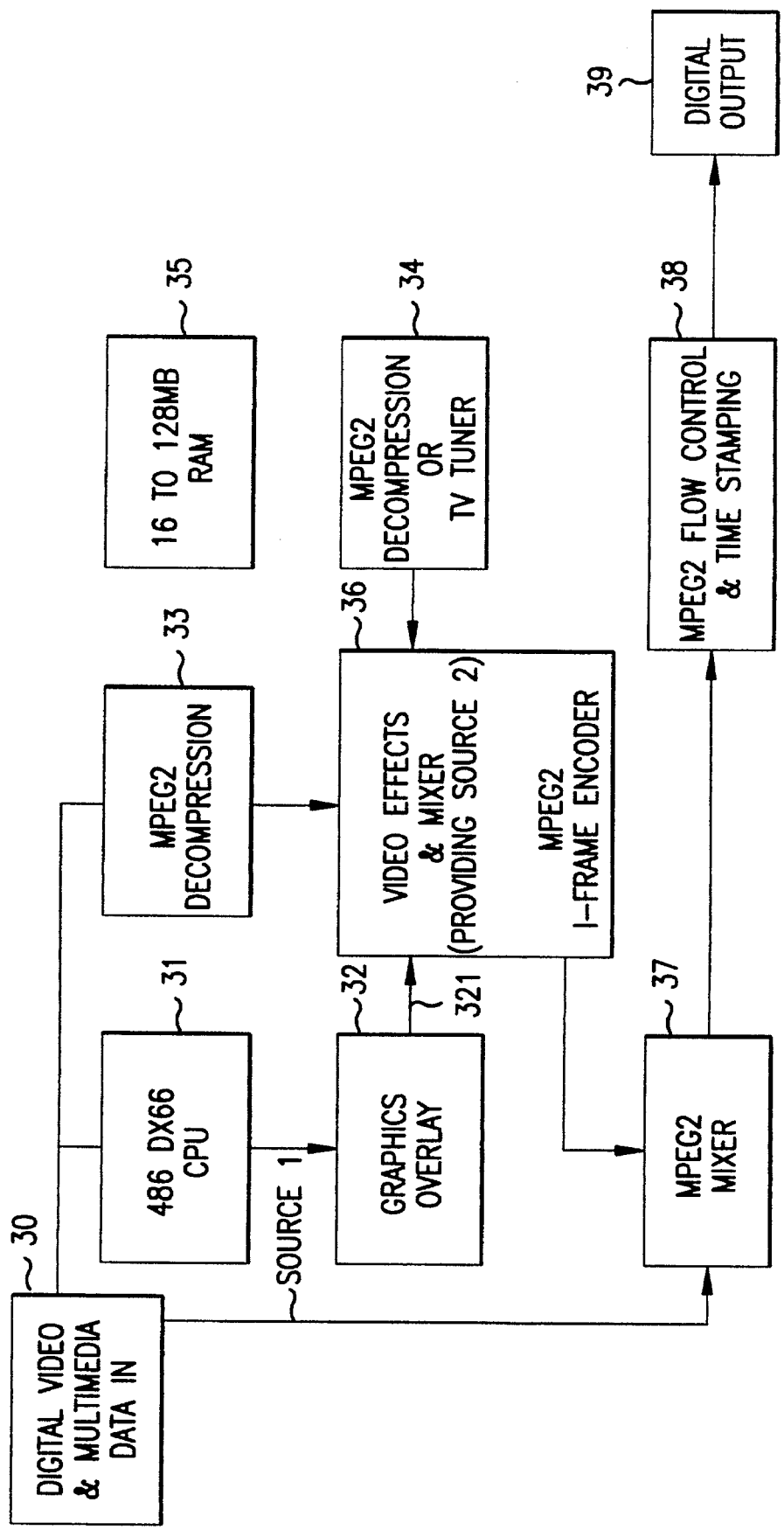
FIG. 3 is a block diagram of an embodiment of the invention for achieving the overlay of FIG. 1.

FIG. 3 is a block diagram for an embodiment of the present invention for achieving the overlay described above. Inputs 30 include the digitally compressed source 1 signal as well as data showing activity of the subscriber's remote unit. (Additional video data may be provided for use in creating the video for region B of FIG. 1. Such additional data may come as digitally compressed data from the inputs 30 and be decompressed by decompressor 33, and/or it may come from other source 34, which may be a decompressor or TV tuner. Data from the subscriber's remote unit is processed by CPU 31, operating with RAM 35, and graphics overlay 32 provides an analog input to mixer-encoder 36. This input 321 shows cursor position and the menu choices available to the subscriber for interaction with the headend. The mixer-encoder 36 first mixes input 321 with inputs from sources 33 and 34, and then encodes the mixed analog signal as a series of I-frames in MPEG2 format. The I-frame encoded output of mixer-encoder 36 is provided to MPEG2 mixer 37, the output of which is subjected to regulation by flow controller 38 to prevent excessively high data rates from appearing at the output 39. This regulation is necessary to prevent the data rates from exceeding the capacity of the distribution system, and, particularly, of the subscriber's equipment.

Figure 4:
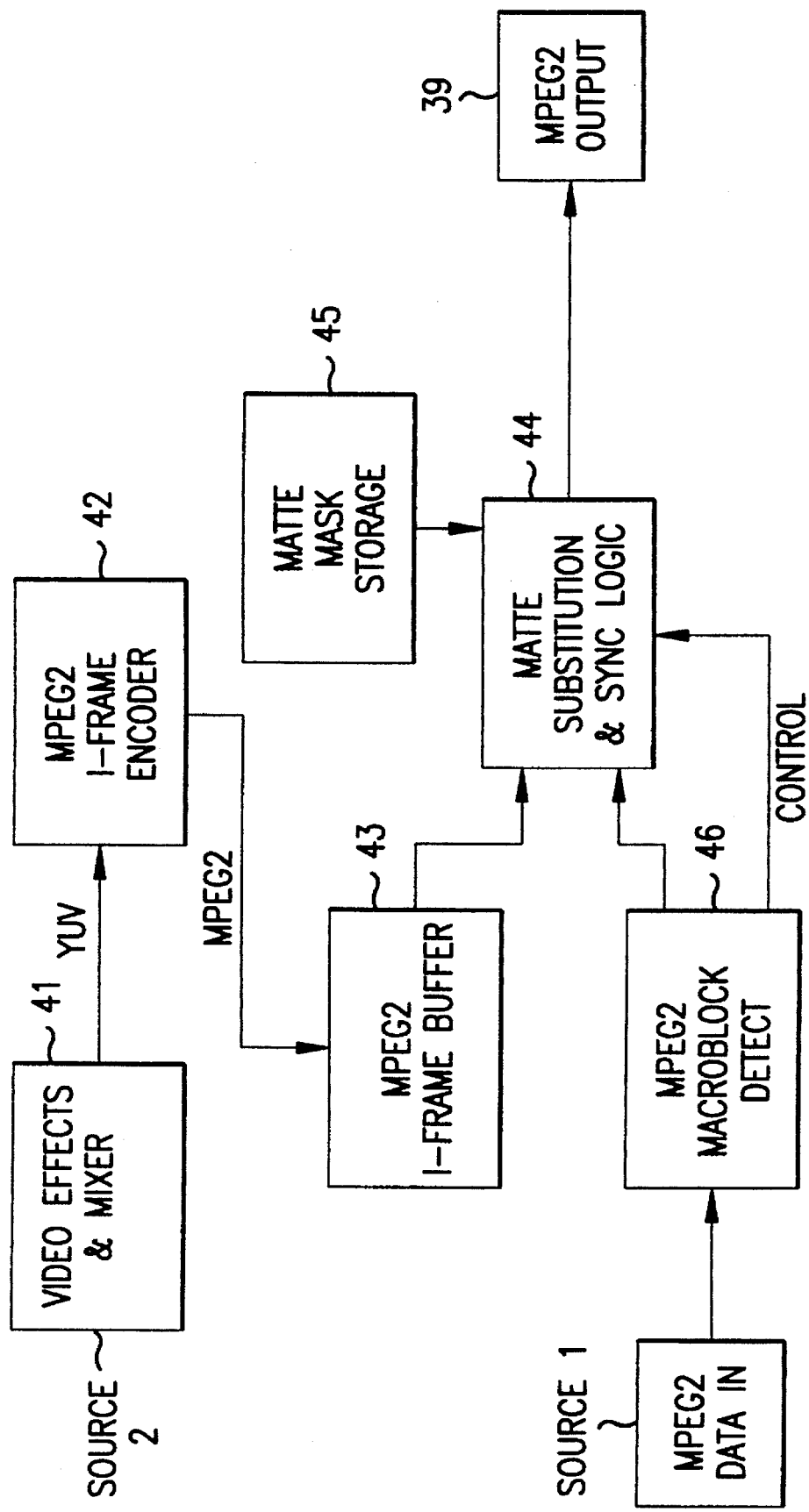
FIG. 4 provides detail of certain portions of FIG. 3.

Detail of the mixer-encoder 36, the MPEG2 mixer 37, and the flow controller 38 is presented in FIG. 4. The MPEG2 encoded digital video data stream identified as source 1 in FIG. 4 is here overlayed with a desired signal output, identified as source 2, from the video effects and mixer module 41. in the manner described herein. In this example, source 2 is in analog YUV format. The source 2 signal is then digitally encoded by encoder 42 as a series only of I-frames in MPEG2 format. (That is, no B-frames or P-frames are provided in the output from encoder 32. It will be appreciated that the picture content of region B is generally expected to be relatively slowly changing; the changes most commonly expected are primarily those associated with cursor motion and selection of choices by the subscriber. Accordingly, the full MPEG encoding of source 2 is not necessary.

Moreover, constraints on the system are required in order for it to provide appropriate responsiveness. Each frame duration is 1/30th of a second. Encoding source 2 as a series of I-frames will therefore mean up to 1/30th of a second until an action on the subscriber's remote unit (excluding other sources of delay) will have been encoded by encoder 42. Moveover, in addition to the time for encoding here by encoder 42, there must also be taken into account an equal time for decoding for display on the subscriber's television; thus the total delay is double the time for encoding. It is possible, for example, to use P frames along with I frames, but if P frames are used in addition to I frames, the encoding time will be doubled.

The I-frame output of encoder 42 is stored in I-frame buffer 33, the data in which is updated as necessary based on output from the encoder 42. Any of the macroblocks in the I-frame buffer that do not change do not need to be updated, and where there is little change in source 2 video there will be relatively infrequent updating of the buffer 42.

The I-frame data in buffer 43 is selectively inserted in the source 1 MPEG2 encoded data stream in the following manner. The source 1 data stream is run through macroblock detector 46 to detect macroblocks, and its output is provided to the matte substitution processor 44. Matte mask storage register 45 stores the addresses of the macroblocks constituting the matte mask of FIG. 2, and provides data to the matte processor 44. Whenever the processor identifies a macroblock (regardless whether I-, B-, or P-frame) from detector 46 that lies outside (or, alternatively, inside) the matte region defined in register 45, it substitutes an I-frame macroblock of the corresponding address from I-frame buffer 43.

It is possible, if there is a great deal of change in the picture content of source 2, then the output 39 of system would be at a data rate beyond system capacity. In such a case, the processor 44 will continue to block source 1 macroblocks lying outside the matte region, but will refrain from substituting data from the I-frame buffer 43 to the extent necessary to slow the data rate at the output to a rate within system limits.

What is claimed is:

1. A controller, for providing, in a specified region of a television picture generated by a first digitally compressed video signal, an overlay of a second picture embodied in a second video signal, comprising:

an I-frame buffer for storing updated macroblock pixel data in I-frame format derived from the second signal;

matte mask storage register for storing data that identifies the specified region by means of macroblocks;

matte substitution processor, in communication with the matte mask storage register and having as an input the first signal and providing an overlayed output, for inhibiting transmission to the output of any macroblock, of the first signal's data stream, lying in the specified region and for substituting for such macroblock a corresponding macroblock from the I-frame buffer.

2. A controller according to claim 1, wherein the second video signal is in an analog format, further comprising:

an I-frame encoder for encoding the second signal as a series of I-frames, the I-frame encoder having an output in communication with the I-frame buffer.

3. A controller according to claim 2, further comprising:

a macroblock detector in communication with the first signal and the matte substitution processor, for detecting the presence of a macroblock.

4. A controller according to claim 1, wherein the matte substitution processor includes flow control means for refraining from substituting data from the I-frame buffer, while continuing to inhibit transmission of any macroblock of the first signal's data stream lying in the specified region, to the extent necessary to slow the data rate at the overlayed output to a rate within system limits.

5. A controller according to claim 3, wherein the matte substitution processor includes flow control means for refraining from substituting data from the I-frame buffer, while continuing to inhibit transmission of any macroblock of the first signal's data stream lying in the specified region, to the extent necessary to slow the data rate at the overlayed output to a rate within system limits.

6. An interactive television system providing, in a specified region of a television picture generated by a first digitally compressed video signal, an overlay of a graphic display permitting user input via a remote control, such graphic display embodied in a second signal in an analog format, the system comprising:

an I-frame encoder for encoding the second signal as a series of I-frames;

an I-frame buffer for storing updated macroblock pixel data in I-frame format from the I-frame encoder;

matte mask storage register for storing data that identifies the specified region by means of macroblocks;

matte substitution processor, in communication with the matte mask storage register and having as an input the first signal and providing an overlayed output, for inhibiting transmission to the output of any macroblock, of the first signal's data stream, lying in the specified region and for substituting for such macroblock a corresponding macroblock from the I-frame buffer.

7. A controller according to claim 6, further comprising:

a macroblock detector in communication with the first signal and the matte substitution processor, for detecting the presence of a macroblock.

8. A controller according to claim 6, wherein the matte substitution processor includes flow control means for refraining from substituting data from the I-frame buffer, while continuing to inhibit transmission of any macroblock of the first signal's data stream lying in the specified region, to the extent necessary to slow the data rate at the overlayed output to a rate within system limits.

9. A controller according to claim 7, wherein the matte substitution processor includes flow control means for refraining from substituting data from the I-frame buffer, while continuing to inhibit transmission of any macroblock of the first signal's data stream lying in the specified region, to the extent necessary to slow the data rate at the overlayed output to a rate within system limits.

10. A method of overlaying in a specified region of a television picture a first digitally compressed video signal with a second analog video signal, comprising:

encoding the second signal as a series of I-frames;

storing the encoded I-frame macroblock pixel data in an I-frame buffer;

storing data that identifies the specified region by means of macroblocks in a matte mask storage register;

processing the data stream of the first signal and providing an overlayed output, by inhibiting transmission to the output of any macroblock, of the first signal's data stream, lying in the specified region and substituting for such macroblock a corresponding macroblock from the I-frame buffer.

11. A method according to claim 10, further comprising:

refraining from substituting data from the I-frame buffer, while continuing to inhibit transmission of any macroblock of the first signal's data stream lying in the specified region, to the extent necessary to slow the data rate at the overlayed output to a rate within system limits.

12. A method of providing an interactive television system having, in a specified region of a television picture generated by a first digitally compressed video signal, an overlay of a graphic display permitting user input via a remote control, such graphic display embodied in a second signal in an analog format, the method comprising:

encoding the second signal as a series of I-frames;

storing the encoded I-frame macroblock pixel data in an I-frame buffer;

storing data that identifies the specified region by means of macroblocks in a matte mask storage register;

processing the data stream of the first signal and providing an overlayed output, by inhibiting transmission to the output of any macroblock, of the first signal's data stream, lying in the specified region and substituting for such macroblock a corresponding macroblock from the I-frame buffer.

13. A method according to claim 12, further comprising:

refraining from substituting data from the I-frame buffer, while continuing to inhibit transmission of any macroblock of the first signal's data stream lying in the specified region, to the extent necessary to slow the data rate at the overlayed output to a rate within system limits.

\* \* \* \* \*